United States Patent [19]

Takács et al.

[11] 3,917,610
[45] Nov. 4, 1975

[54] AMINO-IMIDAZO AND AMINO-PYRAZOLO-ISOQUINOLINES AND PROCESS FOR THE PREPARATION THEREOF

[75] Inventors: Kalman Takács, Budapest; Laszlo Szekeres, Szeged; Kalman Harsányi, Budapest; Gyula Papp, Szeged; Andras Neszmélyi, Budapest; Éva Benedek, Gyor, all of Hungary

[73] Assignee: Chinoin Gyógyszer és Vegyészeti Termékek Gyára Rt., Budapest, Hungary

[22] Filed: July 2, 1973

[21] Appl. No.: 375,433

[30] Foreign Application Priority Data
June 30, 1972 Hungary .................... OE 10330

[52] U.S. Cl. ........ 260/288 CF; 260/157; 260/240 F; 260/283 CN; 260/287 CP; 260/288 D; 260/288 CE; 424/258
[51] Int. Cl.² ........................................ C07D 217/24
[58] Field of Search .................. 260/288 R, 288 CF

[56] References Cited
UNITED STATES PATENTS
3,557,120   1/1971   Archer et al. ................. 260/288 CF
3,668,208   6/1972   Baxter ........................... 260/288 CF FOREIGN PATENTS OR APPLICATIONS
1,187,348   4/1970   United Kingdom ............. 260/288 D OTHER PUBLICATIONS
Harsangi et al., Chem. Abstr. Vol. 72, 79092Z., 1970.

*Primary Examiner*—Donald G. Daus
*Assistant Examiner*—Mary C. Vaughn
*Attorney, Agent, or Firm*—Karl F. Ross; Herbert Dubno

[57]   ABSTRACT

A compound of the formula

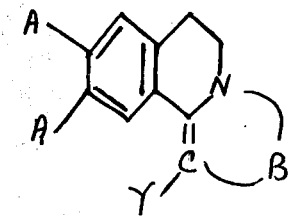

wherein
  A is an alkoxy group containing 1-4 carbon atoms,
  B is a -N=C=NH-D carbamido group, wherein D is hydrogen, or an alkyl, aralkyl, cycloalkyl or acyl group,
  Y is hydrogen, halogen, nitro, nitroso, nitrile, carboxamido, or an alkoxycarbonyl, amino, acylamino or alkyl group or aralkyl, phenyl or phenylazo group.

19 Claims, No Drawings

AMINO-IMIDAZO AND AMINO-PYRAZOLO-ISOQUINOLINES AND PROCESS FOR THE PREPARATION THEREOF

The present invention is directed to new imidazo[5,1-a-] or pyrazolo[5,1-a]-isoquinolines of the formula I, wherein the five-membered condensed ring is substituted on the carbon atom between the nitrogen atoms or on the carbon atom next to the nitrogen atom with amino, substituted amino or acylamino group.

In the formula I

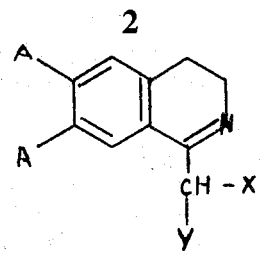

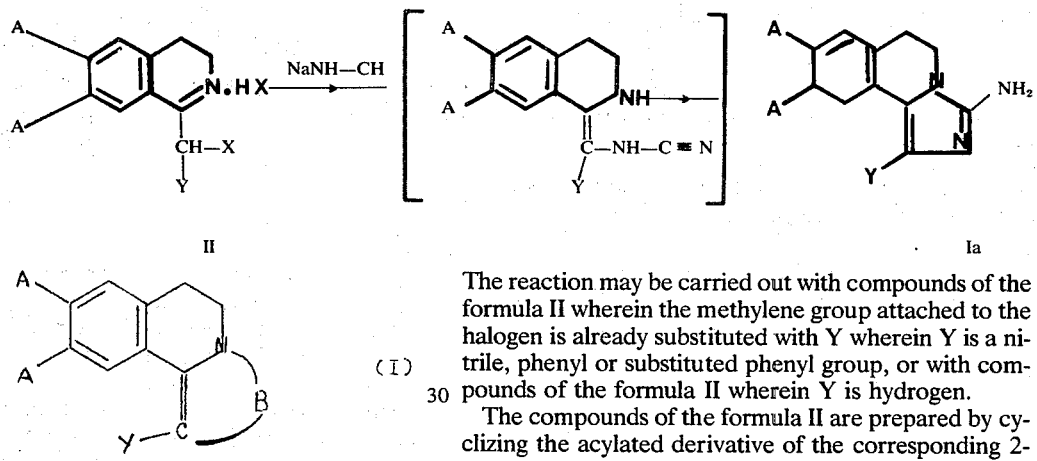

A is an alkoxy group containing 1–4 carbon atoms, B is the —N=C—NHD carbamidino group, wherein D is hydrogen, alkyl or an aralkyl, cycloalkyl or acyl group, Y is hydrogen or halogen, nitro, nitroso, cyano, amino, acylamino, carboxamido, alkyl, or alkoxycarbonyl or an aralkyl, phenyl or phenylazo group substituted with one or more halogen atoms or alkoxy, or nitro groups.

It has been found that compounds of the general formula I decrease the resistance to coronary perfusion, increase such perfusion, moderate oxygen consumption of the heart muscle, improve the ratio of $O_2$ supply/$O_2$ demand of the heart and influence in an advantageous way the efficiency of heart operation.

The compounds of the formula I are condensed amino imidazole or aminopyrazole derivatives, the derivatives obtained by condensation with isoquinoline rings are new.

According to one feature of the present invention aminoimidazole derivatives may be prepared by reacting isoquinoline derivatives of the formula II wherein
X is halogen; with sodium hydrogen cyanamide, the N-monosubstituted cyanamide thus obtained as an intermediate is cyclized with the nitrogen of the iso-basic isoquinoline whereby a ring guanidine is formed to give a compound of the formula Ia according to Reaction scheme 1:

The reaction may be carried out with compounds of the formula II wherein the methylene group attached to the halogen is already substituted with Y wherein Y is a nitrile, phenyl or substituted phenyl group, or with compounds of the formula II wherein Y is hydrogen.

The compounds of the formula II are prepared by cyclizing the acylated derivative of the corresponding 2-phenyl-ethyl-amine, which was acylated with halogen carboxylic acid by the Bischler-Napieralski reaction.

According to a further feature of the preparation of the aminoimidazole derivative there is provided a method wherein amidoximes of the formula III

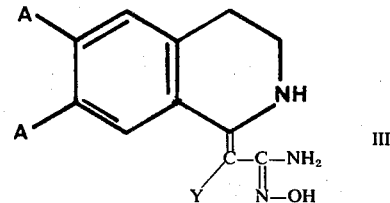

are acylated in a basic medium. As is known, acylation of amidoximes yields O-acyl-derivatives. (Chem. Reviews, 62 155: 1962). Some of these O-acyl-derivatives, e.g. the tosylates, are split off from the simple amidoximes in the form of acid and form N-substituted cyanamide by Beckmann rearrangement according to reaction scheme 2:

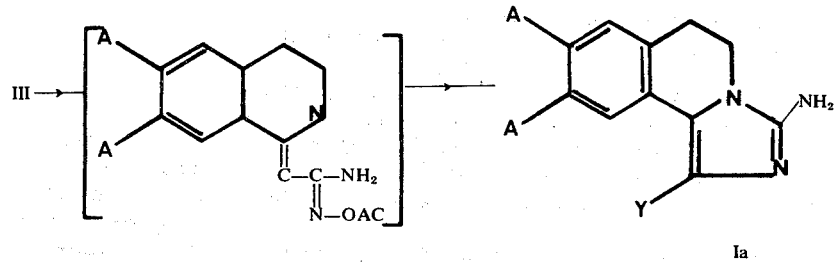

According to a particularly advantageous embodiment of this process the acylation is carried out in pyridine and the acylating agent used is sulfonic acid chloride, carboxylic acid chloride or carboxylic acid anhydride.

The preparation of the compounds of the formula III is described in the Hungarian Patent Specification No. 156,811.

In the case that the condensed ringed amino-imidazoles of the formula Ia are prepared by acylating the amidoximes of the formula III, such compounds of the general formula Ia may be prepared by using the acylating agent in excess, wherein the exocyclic amino group is acylated (NH-Ac.)

The amino-pyrazole derivative of the formula Ib:

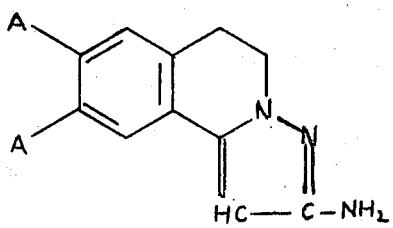

may be prepared by heating the oxadiazole-5-one of the formula IV according to Reaction scheme 3

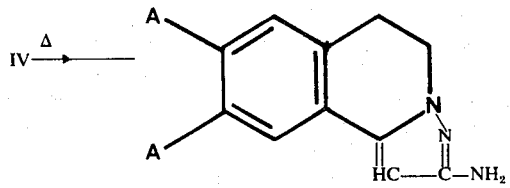

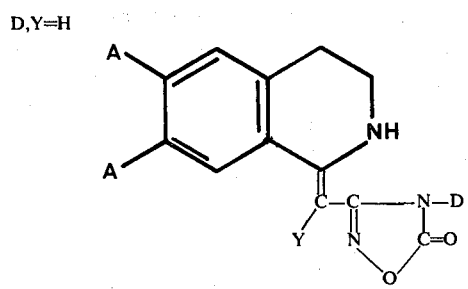

It is known that carbon dioxide is released from oxadiazole-5-one compounds (J. Heterocyclic Chem. 7 59 1970) but the obtained product is very seldom homogeneous (Chem. Ber. 105 813:1972).

According to the present invention the reaction described above may be carried out by in anapolar solvent, particularly in xylene or tetraline, under heating with a good yield. The reaction was carried out at a temperature above 100°C. The same products may be prepared by the alkaline hydrolysis of the compounds of the formula IV (D=H)at the boiling point.

Compounds of the formula IV may be prepared by cyclizing the corresponding N-(2phenethyl)-1,2,4-oxydiazolone-5,3-yl acetic acid amide derivatives by the Bischler-Napieralski reaction.

Compounds of the formulae Ia and Ib substituted in the exocyclic amino group are prepared in the following way:

a. compounds of the formula Ia or Ib, containing an unsubstituted amino group, may be converted, e.g. by acylation, by reductive alkylation through a derivative of azomethine, or b. converting a 1,2,4-oxadiazole-5-one derivative of the formula IV already substituted on $N^4$ according the Reaction scheme 4:

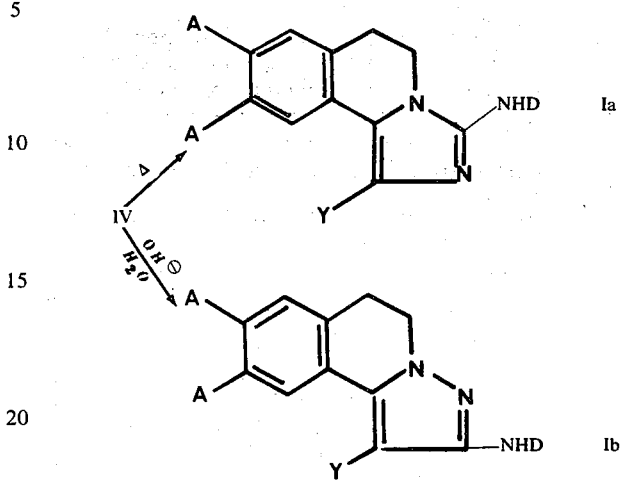

wherein
D is an alkyl, cycloalkyl or aralkyl group and
Y and A are defined above.

It can be definitely proved if a derivative substituted in the exocyclic nitrogen is amino-imidazole Ia or aminopyrazole Ib when as starting material a compound of the general formula Ia or Ib of known structure is used, which is unsubstituted and the exocyclic nitrogen is afterwards substituted with the group D, e.g. by reductive condensation. In this case the product obtained from $N^4$-substituted-1,2,4-oxadiazole-5-one of the formula IV may be identified.

In other cases it may be decided with proton-resistance spectroscopy if a compound belongs to the Ia or Ib compound group, if both condensed five-membered rings contain one C-H bond, this bond is attached to N in the group Ia and to C in the group Ib and thus the location of the methine proton is characteristic for the structure.

According to another feature of the present invention, aminopyrazoles of the general formula Ib and N-acyl derivatives thereof may be also prepared from the compounds of the formula V

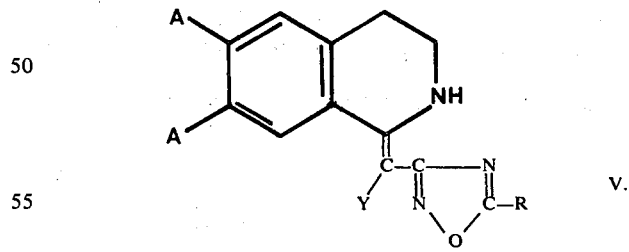

wherein R is alkyl, aryl or aralkyl group which can be substituted with nitro, halogen or alkoxy, and Y is hydrogen, nitroso, nitro, carboxamido, alkyl or aralkyl, phenyl or phenylazo which can be substituted with one or more halogens, alkoxy or nitro group.

The N-acyl derivative according to reaction scheme 5 may be formed in mild alkaline medium on heating in melt or in a solvent or compounds of the general formula Ib are directly formed on strong alkaline hydrolysis, wherein D stands for hydrogen, according to the reaction scheme

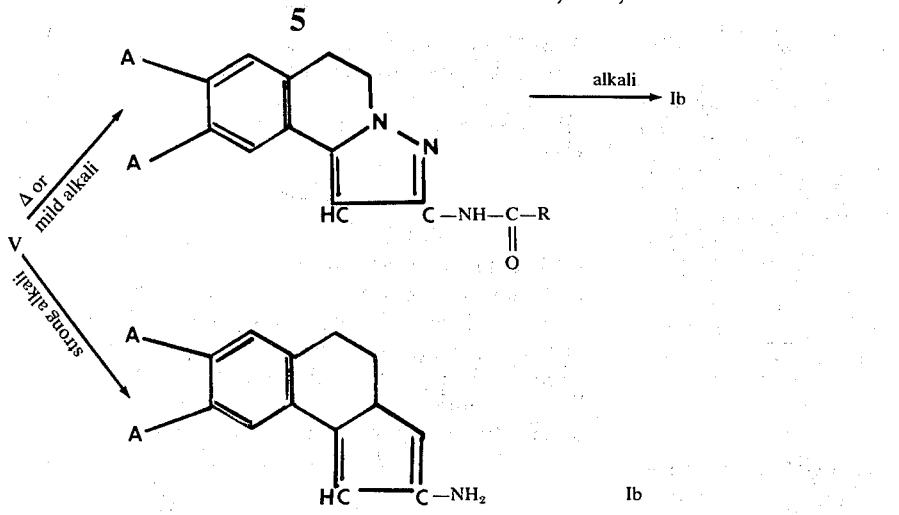

Compounds of the general formula I may be subsequently converted at the methine group of the five membered condensed ring, as e.g. nitration, halogenation or forming of azo-compounds with diazonium compounds. Said process may be carried out with such representatives of the compounds of the general formula I wherein D is an acyl-protecting group and if desired after the introduction of Y the protecting group is removed by hydrolysis. By reduction of the azo-compounds according to a known method, compounds may be formed wherein Y=$NH_2$. Similarly in the case of Ia the same compounds (Y=$NH_2$) are obtained by the reduction of Y=NO compounds.

According to an embodiment of the present invention, compounds of the formula I - wherein Y is a nitrile group - may be hydrolyzed to form compounds of the formula I wherein Y is a carboxamido or alkoxycarbonyl group.

Acid additional salts of the compounds of the formula I may be also prepared by reacting the compounds of the formula I with mineral or organic acids or the corresponding bases are set free from the salts thereof.

The pharmacological tests were carried out in anaesthesized dogs (Nembutal 25 mg/kg i.v.) according to the methods described as follows:

1. Effect on the arterial pressure.

The arterial mean pressure was measured in the artery carotis of the dogs in a bloody way, by the insertion of a Statham measuring instrument with Hellige electromanometer and was registered by a Hellige multiscriptor continuously. The results are illustrated in table 1.

2. Coronary dilating effect.

The coronary perfusion was measured by a thermodilutional process based on constant, steady cold liquid-infusion into the sinus coronarius (Szekeres L., Papp J. Gy., Fischer, E.: Acta Physiol. Acad. Sci. Hung. 33, 115; 1969) and was registered with the aid of a thermoelement, introduced also into the sinus coronarius on a KIPP Micrograph continuously and was expressed as a ratio of the arterial medium pressure (Hgmm.) and of the coronary perfusion, measured in the sinus coronarius (ml/min/100 g.). The results are summarized in the table II.

3. Effect on the oxygenator of the heart.

In the course of the tests carried out in dogs simultaneously with the measuring of the coronary perfusion the oxygen saturation of the blood sample, sucked with steady speed with peristaltic pump through the KIPP Oxymeter from the sinus coronarius and let back to the bronchial vein, was continuously registered. The oxygen saturation of the arterial blood and the haemoglobin content of the blood was also determined with the aid of a Zeiss haemometer. Knowing these data the oxygen consumption of the left heart ventricle was calculated (ml/100g./min.). To characterize the oxidative metabolism of the heart muscle and of the sufficiency of the oxygen supply the $O_2$ supply/$O_2$ demand ratio was also calculated. Details can be found in Szekeres, L., Papp, J. Gy., Fischer, E.: European J. Pharmacol. 2, 1 1967. The results are shown in the table III.

4. Effect on the efficiency of the left heart ventricle.

The extent of the effect on the efficiency of the labor of the left heart ventricle was determined on the basis of the work of the left heart ventricle, calculated from the cardiac output, registered according to the method cold liquid-infusion (Szekeres, L., Papp, J. Gy., Fischer, E.: Acta Physiol. Acad. Sci. Hung., 33, 115; 1969) and from the arterial mean pressure, on knowing the oxygen consumption of the left ventricle, calculated as described above the basis of the ratio of the work of the left heart ventricle (mkg./min.): and of the oxygen consumption of the left heart ventricle (ml./min./100 g.). The results are shown in the table IV.

5. Toxicity.

The acute toxicity investigations were carried out in rats of a bodyweight of 150–200 g. The dose was injected in the caudal vein, a maximum 5 seconds in a volume of 0.2 ml./100g. The $LD_{50}$ value and the tolerance limits were determined on the basis of the number of dead animals within 24 hours, according to the method of Litchfield and Wilcoxon (J. Pharmacol. exp. Ther., 96, 99 1949).

According to a further feature of the present invention there are provided pharmaceoutical compositions containing as active ingredient a compound of the formula I or a salt thereof in admixture with pharmaceutically acceptable inert, non-toxic organic or inorganic carriers or diluents.

The products may be in form of tablets, capsules, suppositories etc. in semisolid form, e.g. ointment or in liquid form, solution, emulsion or suspension. The products may contain auxiliary materials as stabilizers, wetting, emulgating and suspending agents or salts or buffers causing the alteration of the osmotic pressure and further pharmaceutically acceptable excipients, and/or further pharmaceutically active substances.

Further details of the present invention are illustrated in the examples without limiting the scope of the invention to the examples.

EXAMPLE 1a 6.0 g. of technical calcium cyanamide are suspended under heating in 15 ml. of water and 8.0 ml. of sodium hydroxide in a concentration of 10 % are added. The mixture is heated for 15 minutes at 50°–60°C and the precipitation is filtered.

150 ml. of alcohol are added to the filtrate and the mixture is boiled under reflux.

2.7 g. of 1-chloromethyl-6,7-dimethoxy-3,4-dihydro-isoquinoline-hydrochloride are added to the boiling solution within half an hour. Subsequently the reaction mixture is boiled for 4 hours and evaporated to dry in vacuo. 50 ml. of water are added to the residue, the crystalline substance is filtered by suction, dried. 1.8 g. of 3-amino-5,6-dihydro-8,9-dimethoxy-imidazo[5,1-a]isoquinoline are obtained. F.: 232°–236°C. The product is purified by recrystallization from alcohol.

| Analysis: | $C_{13}H_{15}N_3O_2$ calculated | found |
|---|---|---|
| C: | 63.65 % | 63.42 % |
| H: | 6.16 % | 6.32 % |
| N: | 17.13 % | 16.92 % |

The proton in the position 1 appears at 6.70 ppm. in $CDCl_3$-DMSO solution in the NMR spectrum of the product.

EXAMPLE 1b 13.2 g. of [6,7-dimethoxy-3,4-dihydro-isoquinolyl-(1)]-acetamidoxime and 50 ml. of pyridine are mixed together, and while stirring and cooling 9.6 g. of tosylchloride are added within 15 minutes. The reaction mixture is subsequently mixed for 2 hours at 70°C and allowed to stand for one night in the refrigerator. The precipitated product is filtered by suction, washed with absolute alcohol and dried. 9.2 g. of 3-amino-5,6-dihydro-8,9-dimethoxy-imidazo[5,1-a]isoquinoline-hydrochloride are obtained. F.: 272°–274°C (from alcohol). The hydrochloric salt is solved in hot water to set free the base, the solution is alkalized with sodium hydroxide solution of 10 %. Crystallized base is obtained, which is identical with the product of the example Ia.

EXAMPLE 1c

According to the method described in the Example Ib 25.6 g. of 3-amino-5,6-dihydro-8,9-dimethoxy-imidazo[5,1-a]isoquinoline-hydrochloride are obtained from 29.0 g. of [6,7-dimethoxy-3,4-dihydro-isoquinolyl-(1)]-acetamidoxime and from 13 ml. of benzoyl-dihydro-isoquinolyl-(1)-acetamidoxime and from 13 ml. of benzoylchloride, the product is identical with that of the product of the Example Ib.

The same product is obtained if in the above reaction ethyl-chlorocarbonate is used instead of benzoylchloride.

EXAMPLE 2.

14.56 g. of [6,7-diethoxy-3,4-dihydro-isoquinolyl-(1)]-acetamidoxime and 60 ml. of pyridine are mixed and while stirring and cooling 7.6 g. of benzoyl-chloride are added. Subsequently the mixture is stirred at 50°–60°C, and the solvent is evaporated in vacuo. The residue is suspended in ethyl acetate and thus 12.65 g. of 3-amino-5,6-dihydro-8,9-diethoxy-imidazo[5,1-a]isoquinoline-hydrochloride-monohydrate are obtained. Mp.: 206°–208°C (from alcohol).

| Analysis: | $C_{15}H_{22}N_3O_3Cl$ Calculated: | Found: |
|---|---|---|
| C: | 54.96 % | 54.81 % |
| H: | 6.77 % | 6.64 % |
| N: | 12.81 % | 12.76 % |
| Cl: | 10.82 % | 10.69 % |

The said hydrochloric salt is solved in 70 ml. of warm water, the solution is clarified with charcoal, filtered and alkalized with sodium hydroxide solution in a concentration of 10%. 9.7 g. of 3-amino-5,6-dihydro-8,9-diethoxy-imidazo[5,1-a]isoquinoline are obtained. Mp.: 212°–217°C (from alcohol).

| Analysis: | $C_{15}H_{19}N_3O_2$ calculated: | found: |
|---|---|---|
| C: | 65.91 % | 66.10 % |
| H: | 7.01 % | 6.95 % |
| N: | 15.37 % | 15.22 %. |

EXAMPLE 3

3.2 g. of technical calcium cyanamide are mixed in 9 ml. of sodium hydroxide in a concentration of 10% for a quarter of an hour at 60°–70°C and the mixture is filtered. 80 ml. of alcohol are added to the filtrate, the mixture is boiled and 3.34 g. of 1-(1-chloroethyl)-6,7-dimethoxy-3,4-dihydro-isoquinoline-hydrochloride are added to the boiling mixture (Arch. der Pharm. 277, 177, (1939). The reaction mixture is evaporated after boiling for 5 hours and water is added to the residue. 2.0 g. of 1-methyl-3-amino-5,6-dihydro-8,9-dimethoxy-imidazo[5,1-a]isoquinoline are obtained. Mp.: 248°–250°C (from absolute alcohol).

| Analysis: | $C_{14}H_{17}N_3O_2$ calculated: | found: |
|---|---|---|
| C: | 64.84 % | 65.08 % |
| H: | 6.61 % | 6.63 % |
| N: | 16.21 % | 16.44 % |

EXAMPLE 4

200 mg. of 3-[6,7-dimethoxy-3,4-dihydro-1-isoquinolyl]-methyl-5-benzyl-1,2,4-oxadiazole are added to 5 ml. of xylene and the reaction mixture is boiled for 8 hours, under reflux. After cooling 10 ml. of benzene are added to the mixture. 170 mg. of 2-phenylacetylamino-5,6-dihydro-8,9-dimethoxy-pyrazolo[5,1-a]-isoquinoline are obtained. Mp-: 225°–227°C (from butanol).

| Analysis: | $C_{21}H_{21}N_3O_3$ calculated: | found: |
|---|---|---|
| C: | 69.40 % | 69.50 % |
| H: | 5.82 % | 5.80 % |
| N: | 11.56 % | 11.45 % |

EXAMPLE 5a 5 g. of 3-[6,7-dimethoxy-3,4-dihydro-1-isoquinolyl]-methyl-$\Delta^2$-1,2,4-oxadiazoline-5-one are melted on a metal base of 180°–200°C. After cooling the solid product is dissolved under heating in 30 ml. of aqueous hydrochloric acid of a concentration of 5%, the solution is filtered and alkalized with sodium hydroxide of 10%. The crystallized product is filtered, washed with water and dried. Thus 3 g. of 2-amino-5,6-dihydro-8,9-dimethoxy-pyrazolo-[5,1-a]isoquinoline are obtained. Mp.: 216–217°C (from alcohol).

| Analysis: | $C_{13}H_{15}N_3O_2$ Calculated: | Found: |
|---|---|---|
| C: | 63.65 % | 63.45 % |
| H: | 6.16 % | 6.40 % |
| N: | 17.13 % | 16.95 % |

The proton in the position 1 appears at 5.85 ppm. in the NMR spectrum of the product.

EXAMPLE 5b 65 ml. of xylene are added to 13 g. of 3-[6,7-dimethoxy-3,4-dihydro-1-isoquinolyl]-methyl-$\Delta^2$-1,2,4-oxadiazoline-5-one and the reaction mixture is boiled under reflux for 3 hours. After cooling the precipitated crystals are filtered and dried. Thus 10 g. of 2-amino-5,6-dihydro-8,9-dimethoxy-pyrazolo-[5,1-a]isoqinoline are obtained. The product is identical with the product decribed in Example 5a On the effect of hydrochloric alcohol from the 96% alcoholic solution of the product, the hydrochloric salt, 2-amino-5,6-dihydro-8,9-dimethoxy-pyrazolo-[5,1-a]isoquinoline-hydrochloride-dihydrate is crystallized. Mp.: 128°–130°C.

| Analysis: | $C_{13}H_{20}N_3O_4Cl$ Calculated: | Found: |
|---|---|---|
| C: | 49.13 % | 49.30 % |
| H: | 6.34 % | 6.11 % |
| N: | 13.22 % | 12.98 % |
| Cl: | 11.16 % | 11.27 % |

EXAMPLE 5C 20 ml. of sodium hydroxide in a concentration of 10 % are added to 1.6 g. of 3-[6,7-dimethoxy-3,4-dihydro-1-isoquinolyl]-methyl-$\Delta^2$-1,2,4-oxadiazoline-5-one and the reaction mixture is boiled under reflux for 8 hours. After cooling 0.9 g. of 2-amino-5,6-dihydro-8,9-dimethoxy-pyrazolo-[5,1-a]-isoquinoline is crystallized and the product is identical with the product described in the Example 5a. The $LD_{50}$ value and the 95 % tolerance limits are 70 (34-148) mg/kg.

According to the facts described above the product decreases the arterial blood pressure in a dose of 1-4 mg/kg i.v., increases the coronary perfusion, decreases the coronary resistance, decreases the oxygen consumption of the heart muscle and improves i.e. increases the ratio $O_2$ supply/$O_2$ demand expressing the oxygenation of the heart and influences favorably the efficiency of the heart working. All these facts show, that under the circumstances of animal-tests the compound meets the requirements of antianginal agents.

Table I

| Dose /mg/kg i.v./ | n | Arterial blood pressure | | |
|---|---|---|---|---|
| | | Basic value (Hgmm.) | Altered value (Hgmm.) | Difference (%) |
| 1 | 5 | 127 | 104 | −18 |
| 2 | 5 | 124 | 92 | −26 |
| 4 | 6 | 105 | 67 | −36 |

Table II

| Dose /mg/kg i.v./ | n | Coronary perfusion ml./min./100 g. | | | Coronary resistance /Hgmm./ml./min/100g. | | |
|---|---|---|---|---|---|---|---|
| | | Basic value | Altered value | Diff. (%) | Basic value | Altered value | Diff. (%) |
| 1 | 5 | 24 | 87 | + 4 | 1.86 | 1.46 | − 22 |
| 2 | 5 | 82 | 100 | +22 | 1.90 | 1.31 | − 31 |
| 4 | 6 | 84 | 108 | +29 | 1.33 | 0.71 | − 47 |

Table III

| Dose /mg/kg. i.v./ | n | $O_2$ consumption of left heart ventricle /ml./min./100 g./ | | | $O_2$ supply/$O_2$ consumpt. of left heart ventr. | | |
|---|---|---|---|---|---|---|---|
| | | Basic value | Altered value | Diff. (%) | Basic value | Altered value | Diff. (%) |
| 1 | 5 | 9.8 | 8.0 | −18 | 1.48 | 1.68 | +14 |
| 2 | 5 | 9.4 | 7.5 | −20 | 1.51 | 1.93 | +28 |
| 4 | 6 | 8.7 | 8.7 | — | 1.77 | 2.12 | +20 |

Table IV

| Dose /mg/kg i.v./ | n | Efficiency of labour of left heart ventr. | | |
|---|---|---|---|---|
| | | Basic value | Altered value | Difference (%) |
| 1 | 5 | 0.35 | 0.49 | +40 |
| 2 | 5 | 0.36 | 0.46 | +28 |
| 4 | 6 | 0.27 | 0.35 | +22 |

EXAMPLE 6a 50 ml. of alcohol and 10 ml. of sodium hydroxide in a concentration of 10 % are added to 1.75 g. of 3-[6,7-dimethoxy-3,4-dihydro-1-isoquinolyl]-methyl-5-phenyl-1,2,4-oxadiazole and the reaction mixture is boiled under reflux for 3 hours. The alcohol is evaporated in vacuo and water is added to the residue. Thus 1,2 g. of 2-benzoyl amino-5,6-dihydro-8,9-dimethoxy-pyrazolo[5,1-a]isoquinoline are obtained, the product is identical with the product described in Example 17.

EXAMPLE 6b 10 ml. of xylene are added to 1 g. of 3-[6,7-dimethoxy-3,4-dihydro-1-isoquinolyl]-methyl-5-phenyl-1,2,4-oxadiazole and the reaction mixture is boiled under reflux for 8 hours. After cooling 0.9 g. of 2-benzoylamino-5,6-dihydro-8,9-dimethoxy-pyrazolo[5,1-a]isoquinoline crystallizes, the product is identical with the product of the Example 6a.

EXAMPLE 7

25 ml. of alcohol and 7 ml. of sodium hydroxide in a concentration of 40 % are added to 1 g. of 3-[6,7-dimethoxy-3,4-dihydro-1-isoquinolyl]-methyl-5-phenyl-1,2,4-oxadiazole and the reaction mixture is boiled under reflux for 8 hours. Subsequently the alcohol is evaporated in vacuo and water is added to the residue. 0.6 g. of 2-amino-5,6-dihydro-8,9-dimethoxy-pyrazolo[5,1-a]isoquinoline are crystallized and the product is identical with the product described in Example 5.

EXAMPLE 8a 2 g. of 3-(6,7-dimethoxy-3,4-dihydro-1-isoquinolyl)-methyl-4-benzyl-$\Delta^2$-1,2,4-oxydiazoline-5-one are melted on a metal base of 170°–180°C. After cooling the product is crystallized from benzene and thus 1.2 g. of 3-benzyl-amino-5,6-dihydro-8,9-dimethoxy-imidazo[5,1-a]isoquinoline are obtained. Mp.: 135°C.

| Analysis: | $C_{20}H_{21}N_3O_2$ Calculated: | Found: |
|---|---|---|
| C: | 71.62 % | 71.52 % |
| H: | 6.31 % | 5.98 % |
| N: | 12.53 % | 12.42 % |

The proton in the position 1 appears at 6.85 ppm. in the NMR spectrum of the product.

EXAMPLE 8b 10 ml. of xylene are added to 1.5 g. of 3-(6,7-dimethoxy-3,4-dihydro-1-isoquinolyl)-methyl-4-benzyl-$\Delta^2$-1,2,4-oxadiazoline-5-one and the mixture is boiled under reflux for 2 hours. After cooling 1.1 g. of 3-benzylamino-5,6-dihydro-8,9-dimethoxy-imidazo[5,1-a]isoquinoline are crystallized, the product is identical with that described in Example 8a.

EXAMPLE 8c 1.1 g. of benzaldehyde and 20 ml. of absolute alcohol are added to 2.3 g. of 3-amino-5,6-dihydro-8,9-dimethoxy-imidazo[5,1-a]isoquinoline and the reaction mixture is boiled under reflux for 5 hours. After cooling 3.1 g. of 3-benzylidene-amino-5,6-dihydro-8,9-dimethoxy-imidazo-[5,1-a]isoquinoline are crystallized. Mp.: 176°C (from alcohol).

| Analysis: | $C_{20}H_{19}N_3O_2$ Calculated: | Found: |
|---|---|---|
| C: | 72.05 % | 72.35 % |
| H: | 5.75 % | 5.80 % |
| N: | 12.61 % | 12.69 % |

1.6 g. of th said product are dissolved in 100 ml. of methanol and 0.5 g. of sodium borohydride are added to the solution within half an hour. Subsequently the solution is allowed to stand at room temperature whereafter the solvent is evaporated. Water is added to the residue which crystallizes. The product is filtered and dried. 1.7 g. of 3-benzylamino-5,6-dihydro-8,9-dimethoxy-imidazo[5,1-a]isoquinoline are obtained and the product is identical with that of Example 8a.

1.7 g. of the above product are dissolved in hot methanol and the warm solution is acidified with hydrochloric methanol. After cooling 1.4 g. of 3-benzylamino-5,6-dihydro-8,9-dimethoxy-imidazo[5,1-a]isoquinolinehydrochloride are crystallized. Mp.: 250°–252°C.

| Analysis: | $C_{20}H_{22}N_3O_2Cl$ Calculated: | Found: |
|---|---|---|
| C: | 64.59 % | 64.48 % |
| H: | 5.96 % | 6.02 % |
| N: | 11.31 % | 11.50 % |
| Cl: | 9.53 % | 9.31 % |

The compound increases the contractility by 40% in a dose of 1–2 mg/kg. for 26–28 minutes. The cardiac output is increased by 30 % in narcotized dogs in a dose of 2 mg./kg., the duration of the effect is 16 minutes. The resistance of the pulmonal vascular system is decreased in a dose of 2 mg./kg. for 22 minutes. The compound improves the efficiency of the heart function of the narcotized dog. In a dose of 0.5 mg./kg. the compound causes an 77% increase of the femoral perfusion in arcotized dogs for 16 minutes. It increases the perfusion of the carotid system by 31 % for 24 minutes in a dose of 1 mg./kg. In the state of in situ the compound increased the electric fibrillar thershold of the cat-heart-atrial muscle-system by 104% in a dose of 2 mg./kg. The compound increased the electric fibrillar threshold of the cat-heart ventricle muscle-system in the state of in situ in a dose of 2 mg./kg. by 50% for 41 minutes and by 82% in a dose of 4 mg./kg.

EXAMPLE 9a 70 ml. of sodium hydroxide in a concentration of 10% and 400 ml. of alcohol are added to 10 g. of 3-(6,7-dimethoxy-3,4-dihydro-1-isoquinolyl)-methyl-4-benzyl-$\Delta^2$-1,2,4-oxadiazoline-5-one and the reaction mixture is boiled under reflux for an hour. Subsequently the mixture is evaporated to dry in vacuo and water is added to the residue. 8 g. of 2-benzylamino-5,6-dihydro-8,9-dimethoxy-pyrazolo[5,1-a]isoquinoline are obtained. Mp.: 156°C (from alcohol).

| Analysis: | $C_{20}H_{21}N_3O_2$ Calculated: | Found: |
|---|---|---|
| C: | 71.62 % | 71.86 % |
| H: | 6.31 % | 6.08 % |
| N: | 12.53 % | 12.64 % |

EXAMPLE 9b 0.6 g. of benzaldehyde and 10 ml. of absolute alcohol are added to 1.2 g. of 2-amino-5,6-dihydro-8,9-dimethoxy-pyrazolo[5,1-a]isoquinoline and the reaction mixture is boiled under reflux for hours. After cooling 1.1 g. of 2-benzylidene-amino-5,6-dihydro-8,9-dimethoxy-pyrazolo-[5,1-a]isoquinoline are obtained in crystallized form. Mp.: 163°C.

| Analysis: | $C_{20}H_{19}N_3O_2$ Calculated: | Found: |
|---|---|---|
| C: | 72.05 % | 7.188 % |

| Analysis: | $C_{20}H_{19}N_3O_2$ Calculated: | Found: |
|---|---|---|
| H: | 5.75 % | 6.01 % |
| N: | 12.61 % | 12.50 % |

0.9 g. of the above product are dissolved in 100 ml. of methanol and 0.2 g. of sodium borohydride are added to the solution. The solution is allowed to stand for an hour whereafter the solvent is evaporated in vacuo. Water is added to the residue. Thus 0.8 g. of 2-benzylamino-5,6-dihydro-8,9-dimethoxy-pyrazolo[5,1-a]isoquinoline are obtained, the product is identical with that of Example 9a.

5.7 g. of the above product are dissolved in 80 ml. of acetone and the solution is acidified with hydrochloric absolute alcohol.

5.5 g. of 2-benzylamino-5,6-dihydro-8,9-dimethoxy-pyrazolo[5,1-a]isoquinoline-hydrochloride are crystallized. Mp.: 206°–208°C.

| Analysis: | $C_{20}H_{22}N_3O_2Cl$ Calculated: | Found: |
|---|---|---|
| C: | 64.59 % | 64.70 % |
| H: | 5.96 % | 6.12 % |
| N: | 11.31 % | 11.52 % |
| Cl: | 9.53 % | 9.38 % |

The proton in the postion 1 appears at 5.73 ppm. in the NMR spectrum of the product.

EXAMPLE 10

14 ml. of sodium hydroxide in a concentration of 10 % and 80 ml. of alcohol are added to 2 g. of 3-(6,7-diethoxy-3,4-dihydro-1-isoquinolyl)-methyl-4-benzyl-$\Delta^2$-1,2,4-oxadiazoline-5-one and the reaction mixture is boiled under reflux for an hour. Subsequently the mixture is evaporated to dry and water is added to the residue. Thus 1.5 g. of 2-benzylamino-5,6-dihydro-8,9-diethoxy-pyrazolo[5,1-a]isoquinoline are obtained. Mp.: 130°–131°C (from butanol).

| Analysis: | $C_{22}H_{25}N_3O_2$ Calculated: | Found: |
|---|---|---|
| C: | 72.70 % | 72.51 % |
| H: | 6.93 % | 6.86 % |
| N: | 11.56 % | 11.80 % |

EXAMPLE 11

5 ml. of acetic acid anhydride are added to 1 g. of 2-amino-5,6-dihydro-8,9-dimethoxy-pyrazolo[5,1-a]isoquinoline, the reaction mixture is heated on water bath for 10 minutes and allowed to stand for an hour. After pouring on ice 0.8 g. of 2-acetylamino-5,6-dihydro-8,9-dimethoxy-pyrazolo[5,1-a]isoquinoline are crystallized. Mp.: 223°C (from 75% alcohol).

Analysis: $C_{15}H_{17}N_3O_3$

| Analysis: | $C_{15}H_{17}N_3O_3$ Calculated: | Found: |
|---|---|---|
| C: | 62.70 % | 62.56 % |
| H: | 5.96 % | 5.78 % |

| Analysis: | $C_{15}H_{17}N_3O_3$ Calculated: | Found: |
|---|---|---|
| N: | 14.63 % | 14.60 % |

EXAMPLE 12

20 ml. of chloroform and 1,4 g. of potassium carbonate are added to 2.45 g. of 2-amino-5,6-dihydro-8,9-dimethoxy-pyrazolo[5,1-a]isoquinoline and 1.15 g. of chloroacetyl chloride are added under stirring. Subsequently the mixture is stirred for 5 hours at room temperature and 20 ml. of water are added. The chloroformic phase is separated, dried over sodium sulphate and evaporated. 2 g. of 2-chloro-acetyl-amino-5,6-dihydro-8,9-dimethoxy-pyrazolo[5,1-a]isoquinoline are obtained. Mp.: 152°–154°C (from alcohol).

| Analysis: | $C_{15}H_{16}N_3O_3Cl$ Calculated: | Found: |
|---|---|---|
| C: | 55.99% | 56.10% |
| H: | 5.01% | 4.93% |
| N: | 13.06% | 12.80% |
| Cl: | 11.02% | 10.82% |

EXAMPLE 13

30 ml. of acetic acid anhydride are added to 8 g. of 3-amino-5,6-dihydro-8,9-dimethoxy-imidazo[5,1-a]isoquinoline and the mixture is heated on water bath for half an hour. The mixture is poured on 150 ml. of icy water. The solution is neturalized with sodium carbonate and the precipitated crystals are filtered. Thus 6.2 g. of 3-acetyl-amino-5,6-dihydro-8,9-dimethoxy-imidazo[5,1-a]isoquinoline are obtained. Mp.: 225°C (from absolute alcohol).

| Analysis: | $C_{15}H_{17}N_3O_3$ Calculated: | Found: |
|---|---|---|
| C: | 62.70% | 62.40% |
| H: | 5.96% | 5.90% |
| N: | 14.63% | 14.69% |

EXAMPLE 14

30 ml. of chloroform and 1.4 g. of potassium carbonate are added to 2.45 g. of 3-amino-5,6-dihydro-8,9-dimethoxy-imidazo[5,1-a]isoquinoline and under stirring 1.15 g. of chloroacetyl chloride are added. The mixture is stirred at room temperature for 5 hours and 20 ml. of water are added. The chloroformic solution is separated, dried over sodium sulphate and evaporated. 1.4 g. of 3-chloro-acetylamino-5,6-dihydro-8,9-dimethyl-imidazo[5,1-a]isoquinoline are obtained. Mp.: 251°C (from alcohol).

| Analysis: | $C_{15}H_{16}N_3O_3Cl$ Calculated: | Found: |
|---|---|---|
| C: | 55.99% | 56.20% |
| H: | 5.01% | 4.93% |
| N: | 13.06% | 12.84% |
| Cl: | 11.02% | 11.16% |

EXAMPLE 15

1 g. of technical calcium cyanamide are suspended in 5 ml. of luke warm water and 1.4 ml. of sodium hydroxide are added in a concentration of 10 %. The mixture is stirred at 50° to 60°C for a quarter of an hour and the precipitate is filtered. 50 ml. of alcohol are added to the filtrate and the mixture is boiled. 1 g. of α-bromo-6,7-dimethoxy-3,4-dihydro-1-isoquinolyl acetonitrile are added to the boiling solution. The reaction mixture is boiled for 4 hours and is evaporated to dryness. Water is added to the residue. Thus 0.6 g. of 1-cyano-3-amino-5,6-dihydro-8,9-dimethoxy-imidazo[5,1-a]isoquinoline are obtained. Mp.: 236°C (from alcohol).

| Analysis: | $C_{14}H_{14}N_4O_2$ Calculated: | Found: |
|---|---|---|
| C: | 62.21% | 61.61% |
| H: | 5.22% | 5.30% |
| N: | 20.73% | 20.41% |

EXAMPLE 16

15.ml. of water and 0.7 g. of benzoyl chloride are added to 1 g. of 3-amino-5,6-dihydro-8,9-dimethoxy-imidazo[5,1-a]isoquinoline and the pH value of the reaction mixture is held under stirring and cooling at a value of 10-11 by adding a solution of sodium hydroxide in a concentration of 10% to the mixture. 1.3 g. of 3-benzoylamino-5,6-dihydro-8,9-dimethoxy-imidazo[5,1-a]isoquinoline are obtained. Mp.: 268°C (from alcohol).

| Analysis: | $C_{20}H_{19}N_3O_3$ Calculated: | Found: |
|---|---|---|
| C: | 68.75% | 68.60% |
| H: | 5.48% | 5.74% |
| N: | 12.03% | 12.05% |

EXAMPLE 17

0.7 g. of benzoyl chloride are reacted with 1 g. of 2-amino-5,6-dihydro-8,9-dimethoxy-pyrazolo-[5,1-a]isoquinoline according to the method described in Example 15 and thus 1 g. of 2-benzoyl-amino-5,6-dihydro-8,9-dimethoxy-pyrazolo[5,1-a]isoquinoline are obtained. Mp.: 185°C (from alcohol).

| Analysis: | $C_{20}H_{19}N_3O_3$ Calculated: | Found: |
|---|---|---|
| C: | 68.75% | 68.52% |
| H: | 5.48% | 5.65% |
| N: | 12.03% | 11.83% |

EXAMPLE 18

10 ml. of 2-n-hydrochloric acid solution are added to 0.5 g. of 2-acetylamino-5,6-dihydro-8,9-dimethoxy-pyrazolo[5,1-a]isoquinoline and the reaction mixture is boiled under reflux for half an hour. On cooling 0.5 g. of 2-amino-5,6-dihydro-8,9-dimethoxy-pyrazolo 5,1-a isoquinoline-hydrochloride-dihydrate are crystallized, the product is identical with the product of the Example 5. Mp.: 128°–130°C.

EXAMPLE 19

15 ml. of sodium hydroxide solution in a concentration of 5% are added to 1.3 g. of 3-acetylamino-5,6-dihydro-8,9-dimethoxy-imidazo[5,1-a]isoquinoline and the reaction mixture is boiled for an hour under reflux. On cooling 0.8 g. of 3-amino-5,6-dihydro-8,9-dimethoxy-imidazo[5,1-a]isoquinoline are crystallized, the product is identical with the product of the Example 1. Mp.: 234°–236°C.

EXAMPLE 20

10 ml. of xylene are added to 1.0 g. of 3-(6,7-dimethoxy-3,4-dihydro-1-isoquinolyl)-methyl-5-propyl-1,2,4-oxidiazole and the reaction mixture is boiled for 8 hours under reflux. The solvent is evaporated in vacuo and the residue is recrystallized from aqueous alcohol. 0.7 g. of 2-butyryl-amino-5,6-dihydro-8,9-dimethoxy-prazolo[5,1-a]isoquinoline-hemihydrate are obtained. Mp.: 125°–127°C.

| Analysis: $C_{17}H_{21}N_3O_3\times\frac{1}{2}H_2O$ Calculated: | Found: |
|---|---|
| C: 62.94% | 62.80% |
| H: 6.84% | 6.71% |
| N: 12.96% | 12.75% |

EXAMPLE 21

140 mg. of 3-(6,7-dimethoxy-3,4-dihydro-1-isoquinolyl)-methyl-4-ethyl-$\Delta^2$-1,2,4-oxadiazoline-5-one are mixed with 4 ml. of alcohol and 1 ml. of sodium hydroxide in a concentration of 10% and the reaction mixture is boiled for 2 hours under reflux. The solvent is evaporated in vacuo and water is added to the residue. 81 mg. of 2-ethylamino-5,6-dihydro-8,9-dimethoxy-pyrazolo[5,1-a]isoquinoline are obtained. Mp.: 114°–116°C (from alcohol benzene:CCl₄).

| Analysis: | $C_{15}H_{19}N_3O_2$ Calculated: | Found: |
|---|---|---|
| C: | 65.91% | 65.92% |
| H: | 7.01% | 6.93% |
| N: | 15.38% | 15.13% |

What we claim is:
1. A compound of the following formula:

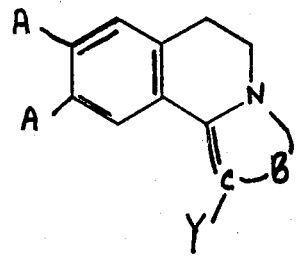

wherein
A is an alkoxy group having 1 to 4 carbon atoms;

B is a —N=C—NH—D carbamido group, wherein D is hydrogen, ethyl, acetyl, chloracetyl, phenylacetyl, benzyl, benzoyl or butyryl, and Y stands for hydrogen, nitrile or methyl.

2. 3-amino-5,6-dihydro-8,9-dimethoxy-imidazo[5,1-a]isoquinoline and pharmaceutically acceptable acid addition salts thereof.

3. 3-amino-5,6-dihydro-8,9-diethoxy-imidazo[5,1-a]isoquinoline and pharmaceutically acceptable acid addition salts thereof.

4. 1-methyl-3-amino-5,6-dihydro-8,9-dimethoxy-imidazo[5,1-a]isoquinoline and pharmaceutically acceptable acid addition salts thereof.

5. 2-phenyl-acetyl-amino-5,6-dihydro-8,9-dimethoxy-pyrazolo[5,1-a]isoquinoline and pharmaceutically acceptable acid addition salts thereof.

6. 2-amino-5,6-dihydro-8,9-dimethoxy-pyrazolo[5,1-a]isoqinoline and pharmaceutically acceptable acid addition salts thereof.

7. 3-benzylamino-5,6-dihydro-8,9-dimethoxy-imidazo[5,1-a]isoquinoline and pharmaceutically acceptable acid addition salts thereof.

8. 2-benzylamino-5,6-dihydro-8,9-dimethoxy-pyrazolo[5,1-a]isoquinoline and pharmaceutically acceptable acid addition salts thereof.

9. 2-benzylamino-5,6-dihydro-8,9-diethoxy-pyrazolo[5,1-a]isoquinoline and pharmaceutically acceptable acid addition salts thereof.

10. 2-acetylamino-5,6-dihydro-8,9-dimethoxy-pyrazolo[5,1-a]isoquinoline and pharmaceutically acceptable acid addition salts thereof.

11. 2-chloroacetylamino-5,6-dihydro-8,9-dimethoxy-pyrazolo[5,1-a]isoquinoline and pharmaceutically acceptable acid addition salts thereof.

12. 3-acetylamino-5,6-dihydro-8,9-dimethoxy-imidazo[5,1-a]isoquinoline and pharmaceutically acceptable acid addition salts thereof.

13. 3-chloroacetyl-amino-5,6-dihydro-8,9-dimethoxy-imidazo[5,1-a]isoquinoline and pharmaceutically acceptable acid addition salts thereof.

14. 1-cyano-3-amino-5,6-dihydro-8,9-dimethoxy-imidazo[5,1-a]isoquinoline and pharmaceutically acceptable acid addition salts thereof.

15. 3-benzolyamino-5,6-dihydro-8,9-dimethoxy-imidazo[5,1-a]isoquinoline and pharmaceutically acceptable acid addition salts thereof.

16. 2-benzoylamino-5,6-dihydro-8,9-dimethoxy-pyrazolo[5,1-a]isoquinoline and pharmaceutically acceptable acid addition salts thereof.

17. 2-butyrylamino-5,6-dihydro-8,9-dimethoxy-pyrazolo[5,1-a]isoquinoline-hemiydrate and pharmaceutically acceptable acid addition salts thereof.

18. 2-ethylamino-5,6-dihydro-8,9-dimethoxy-pyrazolo[5,1-a]isoquinoline and pharmaceutically acceptable acid addition salts thereof.

19. 3-amino-5,6-dihydro-8,9-dimethoxy-imidazo[5,1-a]-isoquinoline.

* * * * *